(12) United States Patent
Kioua et al.

(10) Patent No.: US 12,044,168 B2
(45) Date of Patent: Jul. 23, 2024

(54) AIR INLET OF A TURBOMACHINE NACELLE INCLUDING A CIRCULATION CONDUIT OF A HOT AIR FLOW BETWEEN A MOVABLE UPSTREAM PART AND A FIXED DOWNSTREAM PART

(71) Applicant: SAFRAN NACELLES, Gonfreville-L'Orcher (FR)

(72) Inventors: Hazem Kioua, Moissy-Cramayel (FR); Pierre Charles Caruel, Moissy-Cramayel (FR); Jean-Philippe Joret, Moissy-Cramayel (FR); Charles-Antoine Lampaert, Moissy-Cramayel (FR)

(73) Assignee: SAFRAN NACELLES, Gonfreville-L'Orcher (FR)

( * ) Notice: Subject to any disclaimer, the term of this patent is extended or adjusted under 35 U.S.C. 154(b) by 0 days.

(21) Appl. No.: 18/247,852

(22) PCT Filed: Oct. 1, 2021

(86) PCT No.: PCT/EP2021/077199
§ 371 (c)(1),
(2) Date: Apr. 4, 2023

(87) PCT Pub. No.: WO2022/073891
PCT Pub. Date: Apr. 14, 2022

(65) Prior Publication Data
US 2023/0417182 A1  Dec. 28, 2023

(30) Foreign Application Priority Data
Oct. 7, 2020  (FR) ........................................ 2010266

(51) Int. Cl.
*F02C 7/047*  (2006.01)
*F02C 7/042*  (2006.01)

(52) U.S. Cl.
CPC .............. *F02C 7/047* (2013.01); *F02C 7/042* (2013.01)

(58) Field of Classification Search
CPC ... F02C 7/042; F02C 7/047; B64D 2033/0233
See application file for complete search history.

(56) References Cited

U.S. PATENT DOCUMENTS 4,615,499 A * 10/1986 Knowler ................ B64D 15/04
244/134 B
9,650,126 B2 * 5/2017 Blanchard ............ H02G 11/006
(Continued)

FOREIGN PATENT DOCUMENTS

GB           850691 A       10/1960

OTHER PUBLICATIONS

Search Report from the French Intellectual Property Office on corresponding FR application (FR2010266) dated Jun. 11, 2021.
(Continued)

*Primary Examiner* — David P. Olynick
(74) *Attorney, Agent, or Firm* — Alumen IP Law PC

(57) ABSTRACT

Disclosed is an air intake of a turbine engine nacelle extending along an axis in which a flow of air circulates from upstream to downstream, the air intake extending annularly about the axis, the air intake having a movable upstream portion and a stationary downstream portion, at least one controllable movement member for moving the movable upstream portion between a retracted position and an extended position in order to enable circulation of an air flow passing between the movable upstream portion and the stationary downstream portion, at least one de-icing circuit having at least one circulation channel fluidically connecting the movable upstream portion and a hot air source, the
(Continued)

circulation channel having at least one non-telescopic upstream pipe and at least one telescopic downstream member.

12 Claims, 5 Drawing Sheets

(56) References Cited

U.S. PATENT DOCUMENTS

| | | | |
|---|---|---|---|
| 2014/0127001 A1 | 5/2014 | Todorovic | |
| 2015/0176490 A1* | 6/2015 | Trinh ..................... | B64D 15/02 244/134 R |
| 2018/0283276 A1* | 10/2018 | Todorovic .............. | B64D 33/02 |

OTHER PUBLICATIONS

International Search Report and Written Opinion on corresponding PCT application (PCT/EP2021/077199) from International Searching Authority (EPO) dated Jan. 5, 2022.

\* cited by examiner

[Fig. 1]
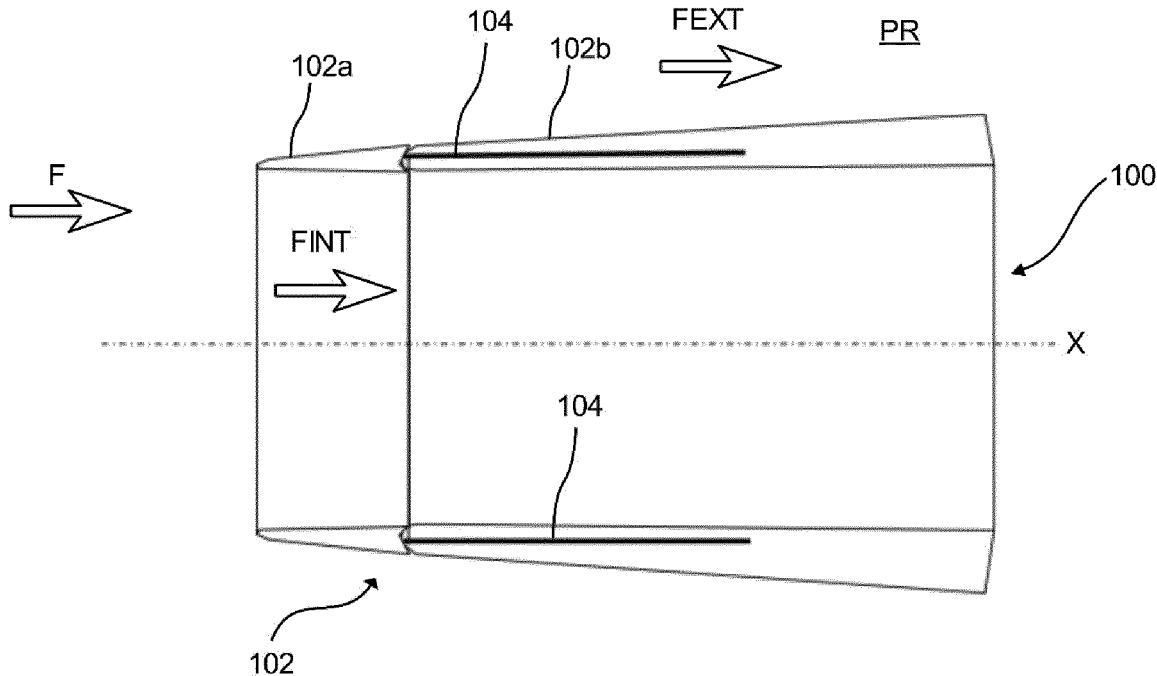
[Fig. 2]
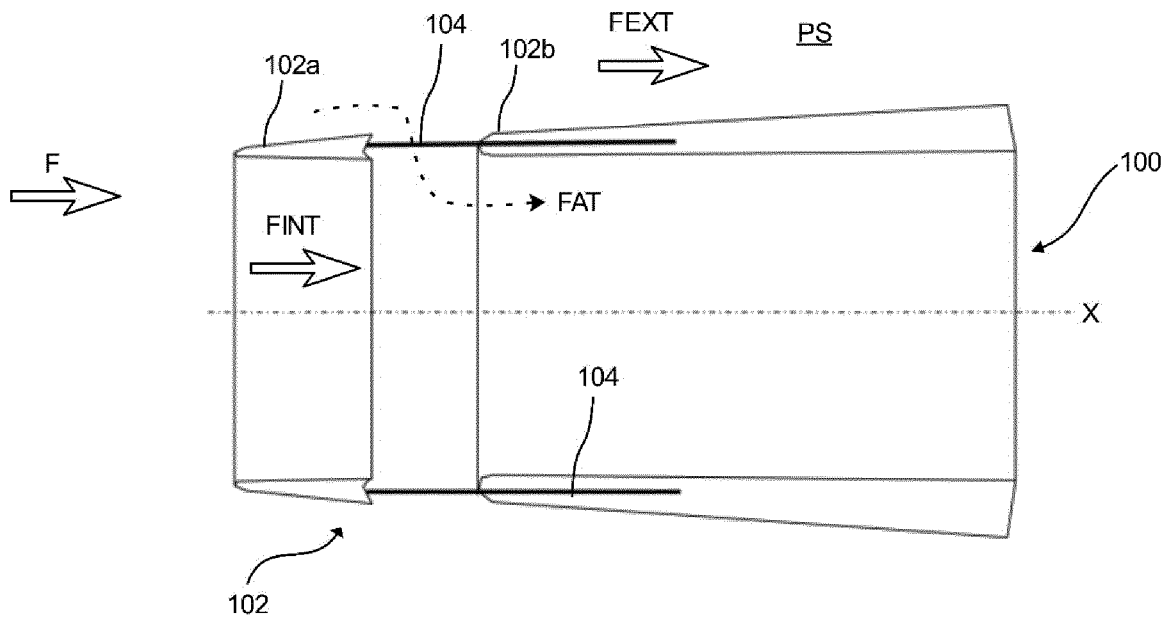

[Fig. 3]
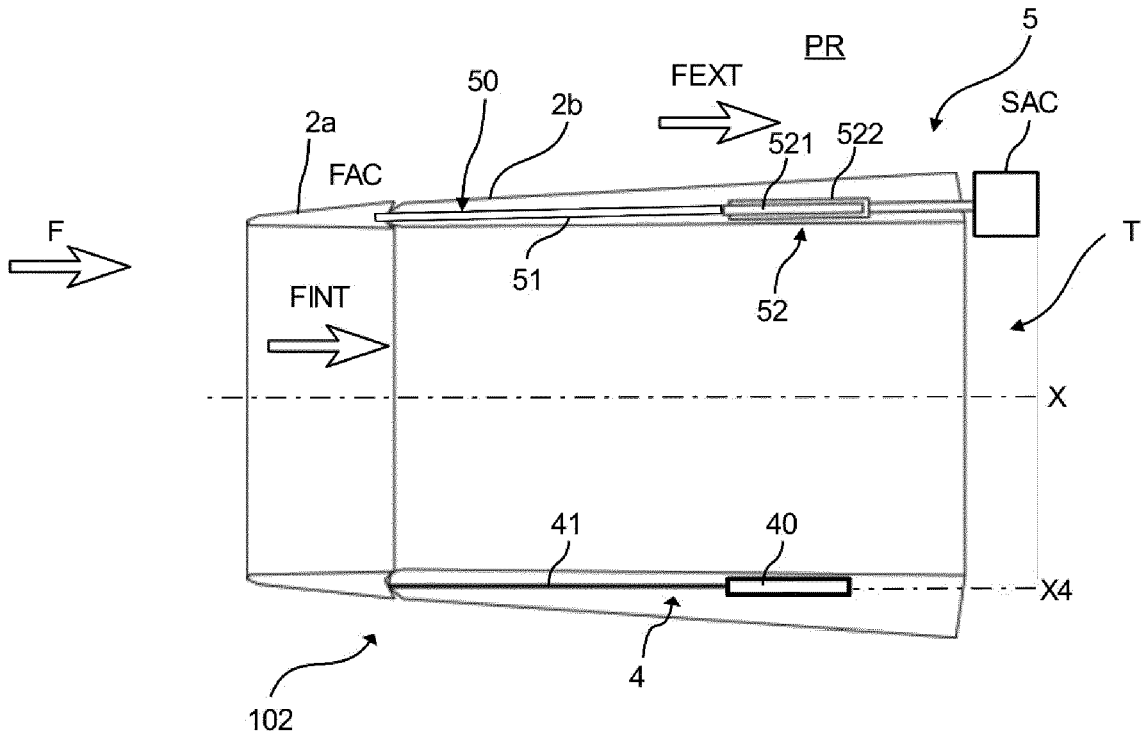
[Fig. 4]
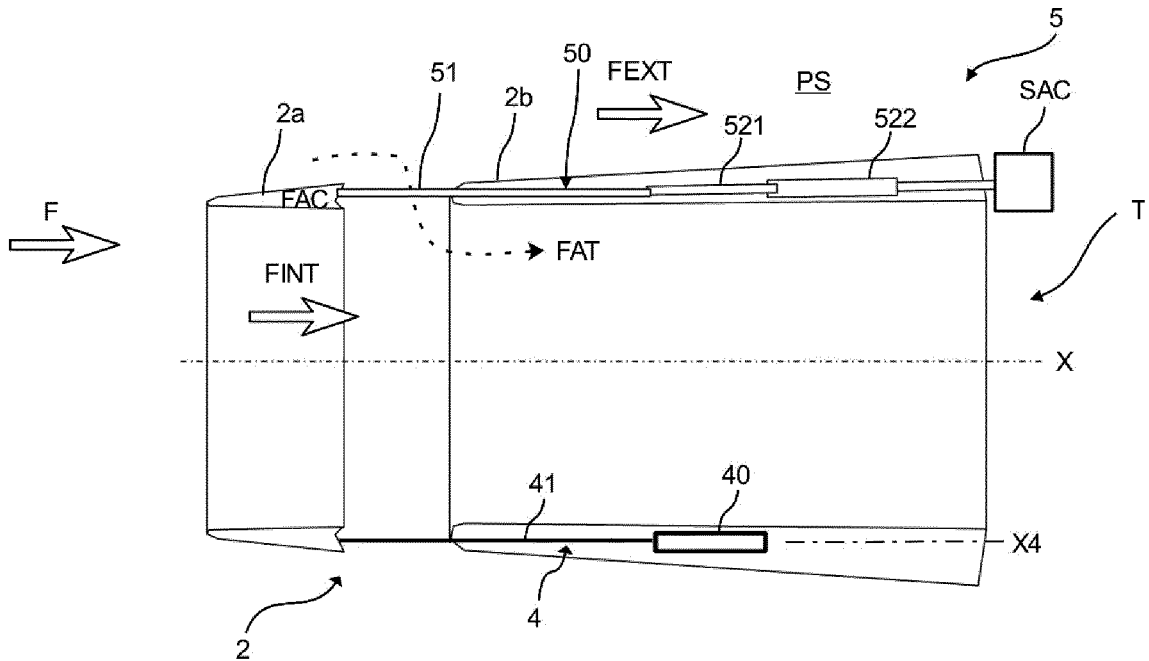

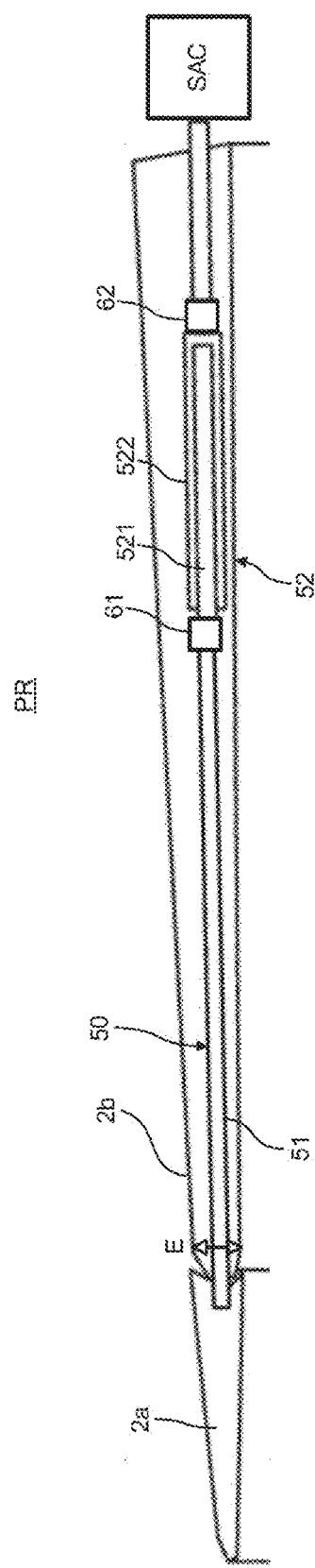
[Fig. 5]

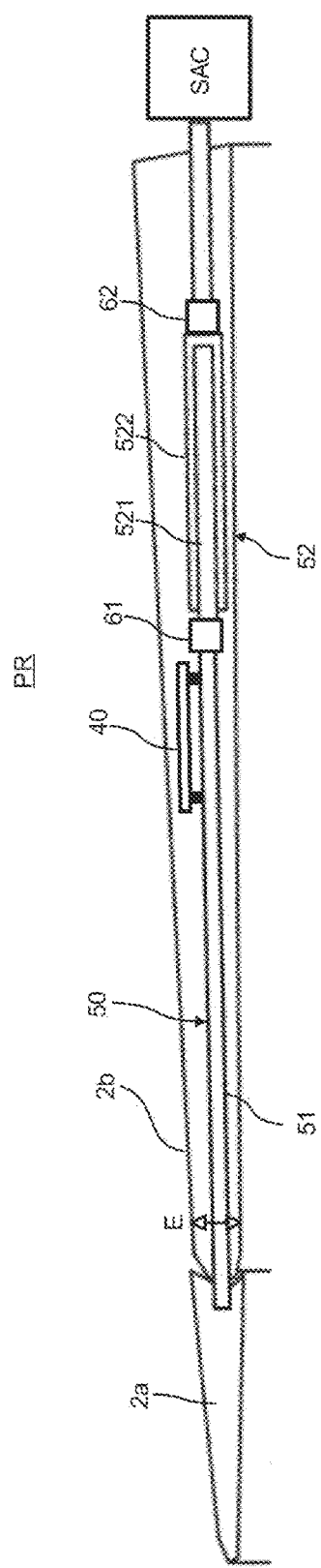
[Fig. 6]

[Fig. 7]
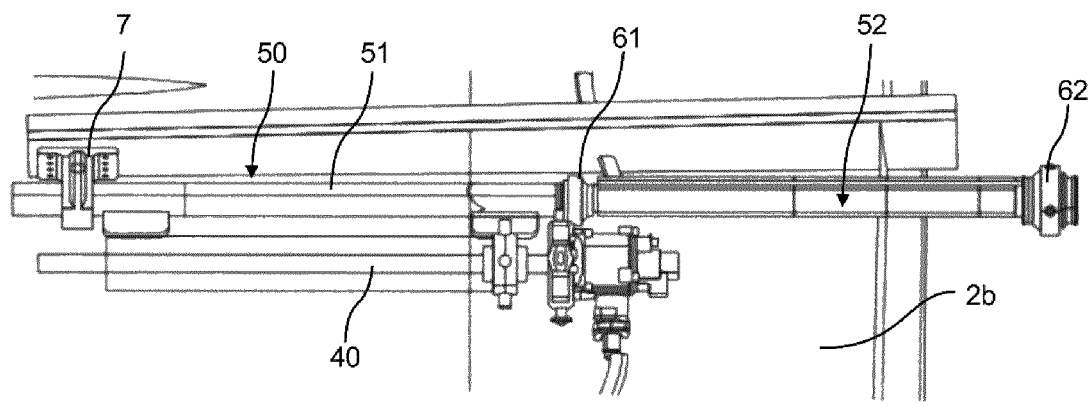
[Fig. 8]
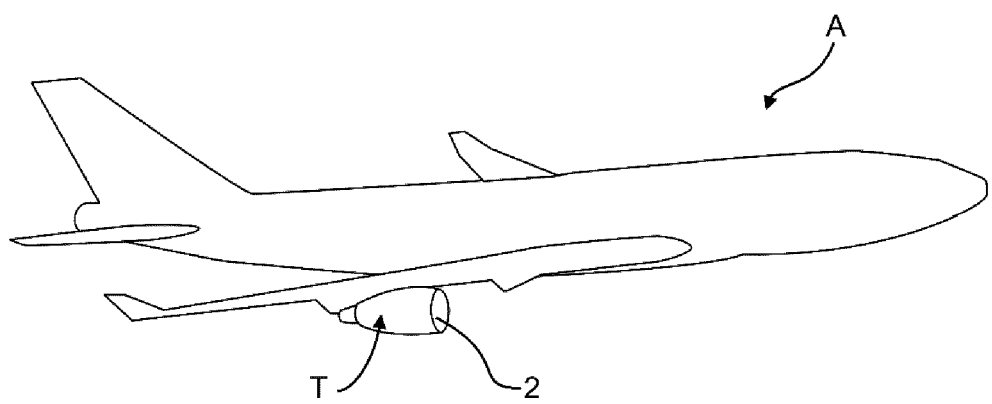

AIR INLET OF A TURBOMACHINE NACELLE INCLUDING A CIRCULATION CONDUIT OF A HOT AIR FLOW BETWEEN A MOVABLE UPSTREAM PART AND A FIXED DOWNSTREAM PART

TECHNICAL FIELD

The present invention relates to the field of aircraft turbomachines and is more particularly directed to a de-icing, or anti-icing, device for an air inlet of a nacelle of an aircraft turbomachine.

BACKGROUND

In a known manner, an aircraft includes one or more turbomachines to enable its propulsion by accelerating an air flow that circulates from upstream to downstream in the turbomachine. A turbomachine includes a nacelle in order to optimize air flows circulating internally and externally to the turbomachine.

Referring to [FIG. 1], a turbomachine 100 extending along an axis X and comprising a fan (not represented) rotatably mounted about the axis X to accelerate an air flow F from upstream to downstream. In the following, the terms upstream and downstream are defined with respect to the axis X oriented from upstream to downstream. Likewise, the terms internal and external are defined radially with respect to the axis X of the turbomachine 100.

The turbomachine 100 comprises a radially external nacelle which comprises an air inlet 102 extending upstream of the fan. An air inlet 102 separates the incoming air flow F into an internal air flow FINT which is accelerated by the fan and an external air flow FEXT which is guided externally to the nacelle.

In a known manner, during the flight of an aircraft, due to temperature and pressure conditions, ice is likely to accumulate at the air inlet to form ice blocks that are likely to be ingested by the turbomachine 100. Such ingestion should be avoided in order to improve the lifetime of the turbomachine 100 and to avoid malfunctions. To avoid ice accumulation, it is known to provide a de-icing device in the annular cavity of the air inlet 102.

In a known manner, for some supersonic aircraft, it is desired to modify the shape of the air inlet 102 so as to adapt to the various flight regimes (high engine output at low speed, low output at high speed, etc.). To this end, with reference to FIGS. 1 and 2, an air inlet 102 has been provided, comprising a movable upstream part 102a connected to a fixed downstream part 102b through several controllable moving members 104 in order to define:
  a retracted position PR ([FIG. 1]) in which the movable upstream part 102a is adjacent to the fixed downstream part 102b in order to form a continuous air inlet 102;
  an extended position PS ([FIG. 2]) in which the movable upstream part 102a is moved away from the fixed downstream part 102b in order to form a discontinuous air inlet 102.

Due to the discontinuity, in the extended position PS, a through air flow FAT can circulate between the movable upstream part 102a and the fixed downstream part 102b of the air inlet 102, thereby improving low speed air pick-up.

In the retracted position PR and in the extended position PS, it is necessary to de-ice the movable upstream part 102a which is in contact with the external air flow FEXT. Integrating a de-icing circuit between the parts 102a, 102b of the air inlet 102 is complex and increases mass of the air inlet 102.

From prior art in patent application GB850691A, an air inlet comprising members for controllably moving a moving upstream part of the air inlet is known. The air inlet also has a de-icing circuit with a plurality of circulation conduits to convey hot air into the moving upstream part. Each circulation conduit is in the form of a telescopic conduit with an internal cylinder mounted in an external cylinder. The external cylinder extends from the source of hot air to the fixed downstream part and has a large diameter to allow passage of an internal cylinder with sufficient cross-section to allow efficient de-icing of the moving upstream part.

When the air inlet has a low thickness, such a technology is no longer contemplatable because the external cylinder is too large in diameter. An immediate solution to eliminate this drawback is to reduce the diameter of the external cylinder. This means reducing the diameter of the internal cylinder and therefore the cross-sectional area, so it is necessary to increase the number of circulation conduits to effectively de-ice the moving upstream part, which increases the mass, cost and complexity.

One of the objectives of the present invention is to allow optimal de-icing of an air inlet that is long and has a reduced thickness.

SUMMARY

The invention relates to an air inlet of an aircraft turbomachine nacelle extending along an axis in which an air flow circulates from upstream to downstream, the air inlet extending annularly about the axis, the air inlet comprising:
  a movable upstream part and a fixed downstream part,
  at least one controllable moving member configured to move the movable upstream part between a retracted position in which the movable upstream part is adjacent to the fixed downstream part and an extended position in which the movable upstream part is moved away from the fixed downstream part to allow circulation of a through air flow between the movable upstream part and the fixed downstream part, and
  at least one de-icing circuit comprising at least one circulation conduit fluidly connecting the moving upstream part and a source of hot air, the de-icing circuit is configured to circulate a hot air flow in the circulation conduit so as to inject a hot air flow into the moving upstream part.

The invention is remarkable in that the circulation conduit comprises at least one upstream non-telescopic piping slidably mounted at the upstream end of the fixed downstream part and at least one downstream telescopic member comprising at least one internal piping mounted in an external piping and in fluid connection with the same, the internal piping being fluidly connected to the upstream non-telescopic piping, the external piping being fluidly connected to the source of hot air.

By virtue of the invention, the telescopic member is positioned downstream in the fixed part in order to limit overall space restrictions. This reduces the air inlet thickness, which is advantageous for a supersonic aircraft. In addition, in the extended or retracted position, the de-icing performance is equivalent.

Preferably, the internal piping is configured to move only in the fixed downstream part. In other words, the internal piping of the telescopic member advantageously does not extend between the movable upstream part and the fixed downstream part in the extended position. The telescopic member is advantageously offset downstream, which limits the overall space at the upstream edge of the fixed downstream part. Thermal expansions of the telescopic member can be more simply attenuated downstream in a larger volume.

Preferably, at least one end of the downstream telescopic member is fitted with a misalignment compensation member, preferably a piston seal, a bellows or a guide ball joint. Preferably, each end of the downstream telescopic member is fitted with a misalignment compensation member. Due to the space available downstream, one or more misalignment compensation members can be installed to correct inaccuracies upon deployment/retraction or mounting.

According to one aspect of the invention, the controllable moving member is directly connected to the circulation conduit, preferably directly to the non-telescopic piping upstream of the circulation conduit. Otherwise, only the circulation conduits are configured to move the upstream part.

Thus, advantageously, it is not necessary to provide control means dedicated to movement in the air inlet. The circulation conduit has a dual function of movement and de-icing. In addition, it avoids icing of moving members that would be dedicated solely to the movement.

Preferably, the fixed downstream part has, at its upstream end, a radial thickness below 180 mm. Such an air inlet is advantageous to improve the aerodynamic performance of a supersonic aircraft.

According to one aspect, the upstream non-telescopic piping has a length at least 2 times higher than the telescopic member in the retracted position.

Preferably, the downstream telescopic member is at least double telescopic, preferably triple telescopic so as to allow significant axial movement while limiting the overall space.

The invention also relates to a nacelle for an aircraft turbomachine, the nacelle comprising at least one air inlet as previously set forth.

The invention also relates to a supersonic aircraft comprising at least one turbomachine mounted in a nacelle as previously set forth.

The invention also relates to a method for de-icing an air inlet as previously set forth, comprising a step of circulating a hot air flow in the circulation conduit so as to de-ice the movable upstream part in the retracted position and in the extended position.

BRIEF DESCRIPTION OF THE DRAWINGS

The invention will be better understood upon reading the following description, given solely as an example, and by referring to the accompanying figures, given as non-limiting examples, wherein identical references are given to similar objects and wherein:

FIG. 1 is a schematic representation of a nacelle air inlet according to prior art in the retracted position.

FIG. 2 is a schematic representation of a nacelle air inlet according to prior art in the extended position.

FIG. 3 is a schematic representation of a nacelle air inlet according to the invention in the retracted position.

FIG. 4 is a schematic representation of a nacelle air inlet according to the invention in the extended position.

FIG. 5 is a close-up schematic representation of the telescopic member of [FIG. 3].

FIG. 6 is a close-up schematic representation of another embodiment of the air inlet.

FIG. 7 is a perspective schematic representation of another embodiment of the air inlet.

FIG. 8 is a schematic representation of an aircraft comprising an assembly of turbine engine and an air inlet.

It should be noted that the figures set out the invention in detail in order to implement the invention, said figures can of course be used to better define the invention if necessary.

DETAILED DESCRIPTION

The invention will be set forth for an aircraft A comprising at least one turbomachine T as illustrated in [FIG. 8], the turbomachine T being equipped with a nacelle with an air inlet 2 according to the invention.

The invention finds advantageous application for a supersonic aircraft A, that is, capable of moving at a speed higher than sound. [FIG. 8] schematically represents the aircraft A, which may have a very different shape.

With reference to FIGS. 3 and 4, a turbomachine T, according to one embodiment of the invention, extending along an axis X and comprising a fan (not represented) rotatably mounted about the axis X in order to accelerate an air flow F from upstream to downstream. In the following, the terms upstream and downstream are defined with respect to the axis X oriented from upstream to downstream. Also, the terms inside and outside are defined radially with respect to the axis X of the turbomachine T. In this example, the turbomachine T is a turbojet engine.

The turbomachine T comprises a radially external nacelle which comprises an air inlet 2 extending upstream of the fan. An air inlet 2 enables the incoming air flow F to be separated into an internal air flow FINT which is accelerated by the fan and an external air flow FEXT which is guided externally to the nacelle.

As illustrated in FIGS. 3 and 4, the air inlet 2 comprises a movable upstream part 2a and a fixed downstream part 2b and at least one controllable moving member 4 configured to move the movable upstream part 2a between:
  a retracted position PR ([FIG. 3]) in which the movable upstream part 2a is adjacent to the fixed downstream part 2b and
  an extended position PS ([FIG. 4]) in which the movable upstream part 2a is moved away from the fixed downstream part 2b in order to allow through air flow FAT between the movable upstream part 2a and the fixed downstream part 2b.

As illustrated in [FIG. 3], in the retracted position PR, the movable upstream part 2a and the fixed downstream part 2b are in contact with each other in order to form a continuous air inlet 2. Conversely, as illustrated in [FIG. 4] representing the extended position PS, the air inlet 2 is discontinuous and a through air flow FAT can circulate between the movable upstream part 2a and the fixed downstream part 2b from outside to inside, thereby improving low speed air pick-up. Preferably, the controllable moving member 4 is configured to move the movable upstream part 2a upstream.

In this exemplary embodiment, the air inlet 2 comprises several controllable moving members 4 which are distributed at the periphery of the air inlet 2 to enable robust and precise movement. It goes without saying that the number of controllable moving members 4, as well as their positioning, may be different.

In this embodiment, with reference to FIGS. 3 and 4, each controllable moving member 4 comprises a movable rod 41 integral with the movable upstream part 2a of the air inlet 2 which extends longitudinally along an axis X4 which is substantially parallel to the turbomachine axis X. The controllable moving member 4 comprises an actuator 40 configured to translationally move the movable rod 41 along the axis X4 between the extended position PS and the retracted position PR.

According to the invention, still with reference to FIGS. 3 and 4, the air inlet 2 comprises a de-icing circuit 5 which is configured to de-ice the movable upstream part 2a which is in contact with the air flow in the retracted position PR. In the extended position PS, the de-icing circuit 5 is configured to de-ice the movable upstream part 2a, which is in contact with the external air flow FEXT.

For this purpose, the de-icing circuit 5 comprises several circulation conduits 50 fluidly connecting the movable upstream part 2a and a source of hot air SAC. The de-icing circuit 5 is configured to circulate a hot air flow FAC in the circulation conduits 50 in order to inject a hot air flow FAC into the movable upstream part 2a.

In this example, with reference to [FIG. 5], the air inlet 2 has a low thickness, that is the fixed downstream part 2b has, at its upstream end, a radial thickness E of less than 180 mm. For a supersonic aircraft A, such a low thickness improves aerodynamic performance but is detrimental to de-icing as explained previously. Although the invention originated for an air inlet 2 of low thickness, the invention advantageously applies to an air inlet 2 of any thickness.

According to the invention, as illustrated in [FIG. 3], the circulation conduit 50 comprises at least one upstream non-telescopic piping 51 slidingly mounted at the upstream end of the fixed downstream part 2b and configured to extend between the upstream portion 2a and the downstream portion 2b in the extended position PS and at least one downstream telescopic member 52 comprising an internal piping 521 mounted in an external piping 522 and in fluid connection with the same, the internal piping 521 being fluidly connected to the upstream non-telescopic piping 51, the external piping 522 being fluidly connected to the source of hot air SAC. Preferably, the upstream non-telescopic piping 51 has a constant cross-sectional area.

Advantageously, an offset downstream of the telescopic member 52 enables the overall size and mass at the upstream end of the fixed downstream part 2b of the air inlet 2 to be reduced. This advantageously makes it possible to reduce the overhang as well as the thickness of the air inlet 2. This is particularly advantageous for a supersonic aircraft A with a long and fine air inlet for aerodynamic reasons. Maintenance of the telescopic member 52 is further facilitated, given that overall space restrictions are lower downstream.

Preferably, the internal piping 521 is configured to move only in the fixed downstream part 2b. In other words, it does not extend between the upstream portion 2a and the downstream portion 2b in the extended position PS. This is particularly advantageous to provide optimal guidance of the telescopic member 52.

In this example, the telescopic member 52 is of the simple type and comprises only an internal piping 521 and an external piping 522. It goes without saying that the telescopic member 52 may comprise several pipings inserted into each other. In particular, the telescopic member 52 could be of the double type and include an internal piping 521 mounted in a central piping in turn mounted in an external piping 522. Such a telescopic member makes it possible to reduce the overall space significantly. The telescopic member 52 could also be triple telescopic.

Deployment of the telescopic member 52 is performed by means of a controlled actuator (active deployment) or passively as a result of the movement of the movable upstream part 2a of the air inlet 2.

According to one preferred aspect of the invention, with reference to [FIG. 5], at least one end of the telescopic member 52 is fitted with a misalignment compensation member 61, 62. In this example, each misalignment compensation member 61, 62 is in the form of a ball joint, but of course it could be in the form of a piston seal or a bellows. Preferably, each end of the telescopic member 52 is fitted with a misalignment compensation member 61, 62 in order to limit clearances with, on the one hand, the upstream non-telescopic piping 51 slidably mounted at the upstream end of the fixed downstream part 2b and, on the other hand, the source of hot air SAC. Due to downstream positioning, it is possible to provide such compensating devices 61, 62 without increasing complexity and overall space at the upstream edge of the fixed part 2b.

In order to ensure optimum tightness when extending/retracting the telescopic member 52, it is fitted with tightness members in a known manner between the different consecutive pipings it contains.

In this first embodiment, with reference to FIGS. 3 and 4, the de-icing circuit 5 is independent of the controllable moving members 4. Preferably, each circulation conduit 50 is deployed indirectly by deploying the controllable moving members 4. In other words, each circulation conduit 50 is passively deployed as a result of the movement of the movable upstream part 2a of the air inlet 2 by the controllable moving members 4.

In this second embodiment, with reference to FIGS. 6 and 7, at least one circulation conduit 50 is a controllable moving member 4. Such a characteristic makes it possible to reduce the overall space significantly, which is advantageous for a fixed downstream part 2b with a very low thickness.

The controllable moving member 4 is used as a means for conducting the hot air flow FAC and there is no need to provide additional technical means which would be detrimental to the mass and overall size. In this embodiment, all the controllable moving members 4 are configured to conduct a hot air flow FAC, but of course only some of them could be used for this purpose.

To this end, with reference to FIGS. 6 and 7, an actuator 40 is directly connected to the circulation conduit 50 to move the telescopic member 52, that is to move its internal piping 521 in relation to its external piping 522. The circulation conduit 50 is thus actively moved.

According to one preferred aspect, the actuator 40 is directly connected to the upstream non-telescopic piping 51 in order to limit stresses applied to the telescopic member 52 and thus improve its service life. Thus, the upstream non-telescopic piping 51 performs the same function as the movable rod 41 of [FIG. 3]. As illustrated in [FIG. 7], the upstream non-telescopic piping 51 is translationally guided by longitudinally distributed guides 7.

One exemplary implementation will be set forth with reference to FIGS. 3 and 4. When the aircraft flight in conditions requiring de-icing to be activated, the source of hot air SAC successively supplies the telescopic member 52 and the non-telescopic piping 51 with a hot air flow FAC.

Depending on the aircraft's initial flight conditions, the air inlet 2 is in the retracted position PR as illustrated in [FIG. 3]. In this retracted position PR, the movable upstream part 2a is adjacent to the fixed downstream part 2b of the air inlet 2 and. The controllable moving member 4 is in the retracted position downstream, the telescopic member 52 is folded. The circulation conduit supplies the moving upstream part 2a of the air inlet 2 as illustrated in [FIG. 3].

When second flight conditions of the aircraft are detected, the controllable moving member 4 is activated so as to translationally move the movable upstream part 2a along the axis X4 upstream. The air inlet 2 is then in the extended position PS as illustrated in [FIG. 4].

In this extended position PS, the movable upstream part 2a is moved away from the fixed downstream part 2b of the air inlet 2, which permits the through air flow FAT to contact the fixed downstream part 2b of the air inlet 2. As a result of the activation of the controllable moving member 4, the controllable moving member 4 is in the extended position PS upstream. The non-telescopic piping 51 extends between the movable upstream part 2a and the fixed downstream part 2b of the air inlet 2, that is in contact with the through air flow FAT to convey a hot air flow FAC.

The invention claimed is:

1. An air inlet of a nacelle for an aircraft turbomachine extending along an axis in which an air flow circulates from upstream to downstream, the air inlet extending annularly about the axis, the air inlet comprising:
    a movable upstream part and a fixed downstream part,
    at least one controllable moving member configured to move, during operation of the turbomachine, the movable upstream part between a retracted position in which the movable upstream part is adjacent to the fixed downstream part and an extended position in which the movable upstream part is movable away from the fixed downstream part to allow circulation of a through air flow to flow between the movable upstream part and the fixed downstream part,
    at least one de-icing circuit comprising at least one circulation conduit fluidly connecting the movable upstream part and a hot air source, the at least one de-icing circuit is configured to circulate hot air in the at least one circulation conduit so as to inject hot air flow into the movable upstream part, wherein the at least one circulation conduit comprises:
        at least one upstream non-telescopic piping slidably mounted at an upstream end of the fixed downstream part, and
        at least one downstream telescopic member comprising at least one internal piping mounted in an external piping and the internal and external pipings in fluid connection with one another, the at least one internal piping being fluidly connected to the at least one upstream non-telescopic piping, the external piping being fluidly connected to the hot air source, and the at least one internal piping being configured to move only in the fixed downstream part.

2. The air inlet according to claim 1, wherein at least one end of the at least one downstream telescopic member is fitted with a misalignment compensation member.

3. The air inlet according to claim 1, wherein the at least one controllable moving member is directly connected to the at least one circulation conduit.

4. The air inlet according to claim 3, wherein the at least one controllable moving member is directly connected to the at least one upstream non-telescopic piping of the at least one circulation conduit.

5. The air inlet according to claim 1, wherein the fixed downstream part has, at its upstream end, a radial thickness of less than 180 mm.

6. The air inlet according to claim 1, wherein the at least one upstream non-telescopic piping has a length at least 2 times higher than the at least one telescopic member in the retracted position.

7. The air inlet according to claim 1, wherein the at least one downstream telescopic member is at least double telescopic.

8. The air inlet according to claim 7, wherein the at least one downstream telescopic member is triple telescopic.

9. A nacelle for an aircraft turbomachine, the nacelle comprising at least one air inlet according to claim 1.

10. A supersonic aircraft comprising at least one turbomachine mounted in the nacelle according to claim 9.

11. A method for de-icing an air inlet according to claim 1, comprising a step of circulating the hot air flow in the at least one circulation conduit in such a way as to de-ice the moving upstream part in the retracted position and in the extended position.

12. An air inlet of a nacelle for an aircraft turbomachine extending along an axis in which an air flow circulates from upstream to downstream, the air inlet extending annularly about the axis, the air inlet comprising:
    an upstream part and a downstream part, wherein the downstream part is fixed relative to a reference point and the upstream part is movable relative to the downstream part;
    a controllable moving member configured to move, during operation of the turbomachine, the upstream part between a retracted position in which the upstream part is located adjacent to the downstream part and an extended position in which the upstream part is movable away from the downstream part and a gap is located between the upstream part and the downstream part for air flow to flow into the gap between the upstream part and the downstream part,
    a de-icing circuit comprising a circulation conduit fluidly connecting the upstream part to a hot air source, the de-icing circuit is configured to circulate hot air in the circulation conduit and the upstream part, wherein the circulation conduit comprises:
        an upstream non-telescopic piping slidably mounted at an upstream end of the downstream part, and
        a downstream telescopic member comprising an internal piping mounted in an external piping and the internal and external pipings in fluid connection with one another, the at least one internal piping being fluidly connected to the upstream non-telescopic piping, the external piping being fluidly connected to the hot air source, and the internal piping being configured to move only in the downstream part.

* * * * *